Figure 1:
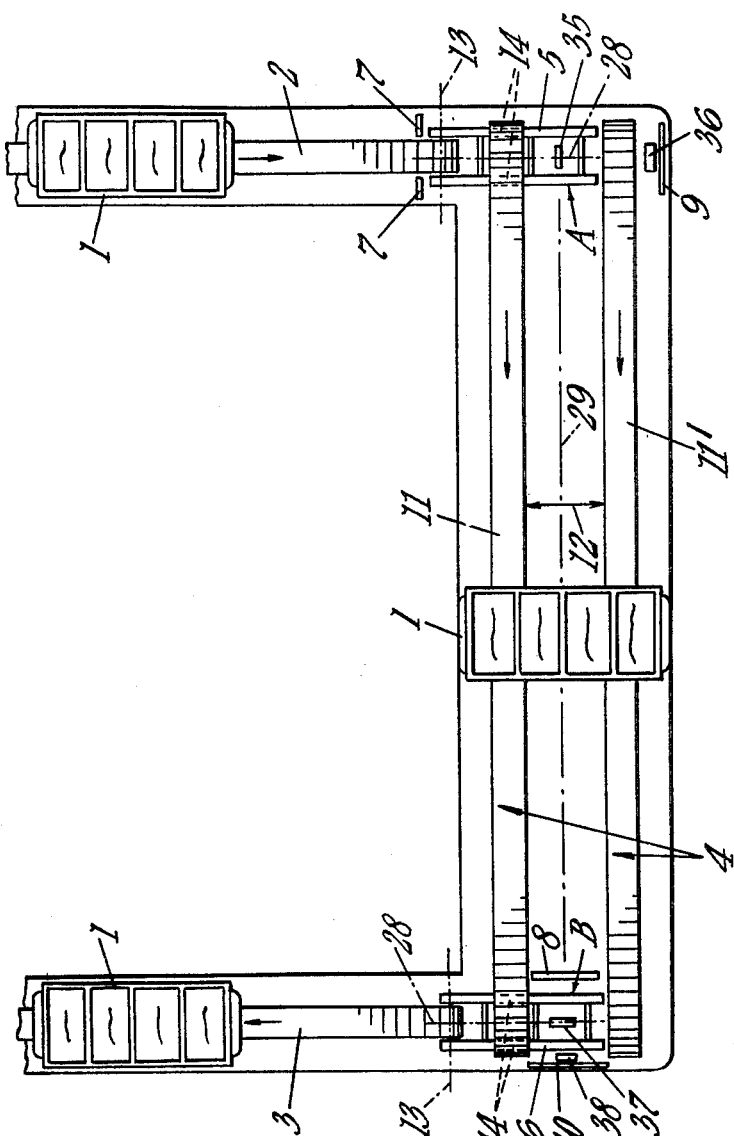

Aug. 28, 1962   E. J. HORSFORD   3,051,289
CONVEYOR DEVICES
Filed Sept. 2, 1959   4 Sheets-Sheet 4

INVENTOR
ERIC JOHN HORSFORD
BY
Learman, Learman, & McCulloch

United States Patent Office 3,051,289
Patented Aug. 28, 1962

3,051,289
CONVEYOR DEVICES
Eric J. Horsford, Peterborough, England, assignor to Baker Perkins Incorporated, Saginaw, Mich.
Filed Sept. 2, 1959, Ser. No. 837,699
Claims priority, application Great Britain Sept. 5, 1958
7 Claims. (Cl. 198—20)

This invention relates to devices for transferring articles from one moving conveyor means (hereinafter referred to as the feeding conveyor) to another conveyor (hereinafter referred to as the receiving conveyor) extending at an angle thereto and has for its aim the provision of an improved transfer device which can effect the desired transfer such that, as the transfer occurs, the transferred article is correctly positioned and orientated on the receiving conveyor means.

A further aim of the present invention is to provide an improved transfer device as set out above, which permits both the conveyor means to be continuously running.

According to the invention articles delivered along the axis of the feeding conveyor are accepted one by one by the transfer device which elevates the accepted article clear of both the receiving and feeding conveyors so that the article is supported only on the transfer device and which further conveys the article, until it is correctly positioned for transfer to the receiving conveyor means. Where the axis of conveying movement of the transfer device is aligned with the axis of the feeding conveyor, the receiving conveyor means extends across the axis of the feed conveyor and the transfer device elevates the article fed thereto above the level of the receiving conveyor and when the article has reached its proper alignment relative to the receiivng conveyor the transfer device lowers the article until it is engaged by, and supported solely on, the receiving conveyor which carries it away. Where the axis of conveying movement of the transfer device is at right angles to the axis of the feed conveyor and is aligned with the receiving conveyor, the feeding conveyor extends across the axis of the receiving conveyor and the transfer device lifts to elevate the article on the feeding conveyor clear of the feeding conveyor and conveys it towards and onto the aligned receiving conveyor.

The invention consists in a device for transferring spaced articles from a moving feeding conveyor means to a moving receiving conveyor means at an angle thereto comprising a driven transfer conveyor means bridging the gap at the transfer station between the two conveyor means and aligned in directional prolongation of one of the conveyor means, the transfer conveyor means being mounted for raising and lowering movements about a horizontal axis disposed adjacent the termination of the conveyor means with which the transfer conveyor means is aligned and controlled in such movements whereby when an article is at the transfer station the raising or lowering of the transfer conveyor means permits the completion of the transfer of the article from the feeding conveyor means to the receiving conveyor means.

The invention further consists in a transfer device according to the preceding paragraph, wherein a raising of the transfer conveyor means causes an article to be supported thereon and carried over the centre line of the receiving conveyor means to which the article is to be transferred and subsequent lowering of the transfer conveyor means transfers the support of the article to the receiving conveyor means which carries the article out of the transfer station.

The invention still further consists in a transfer device according to the preceding paragraph but one, wherein a raising of the transfer conveyor means causes the support of an article at the transfer station to be transferred from the feeding conveyor means to the transfer conveyor means which carries the article away and on to the receiving conveyor means, the subsequent lowering of the transfer conveyor means permitting a suceeding article to be delivered over the transfer conveyor means for the next transfer operation.

Figure 2:
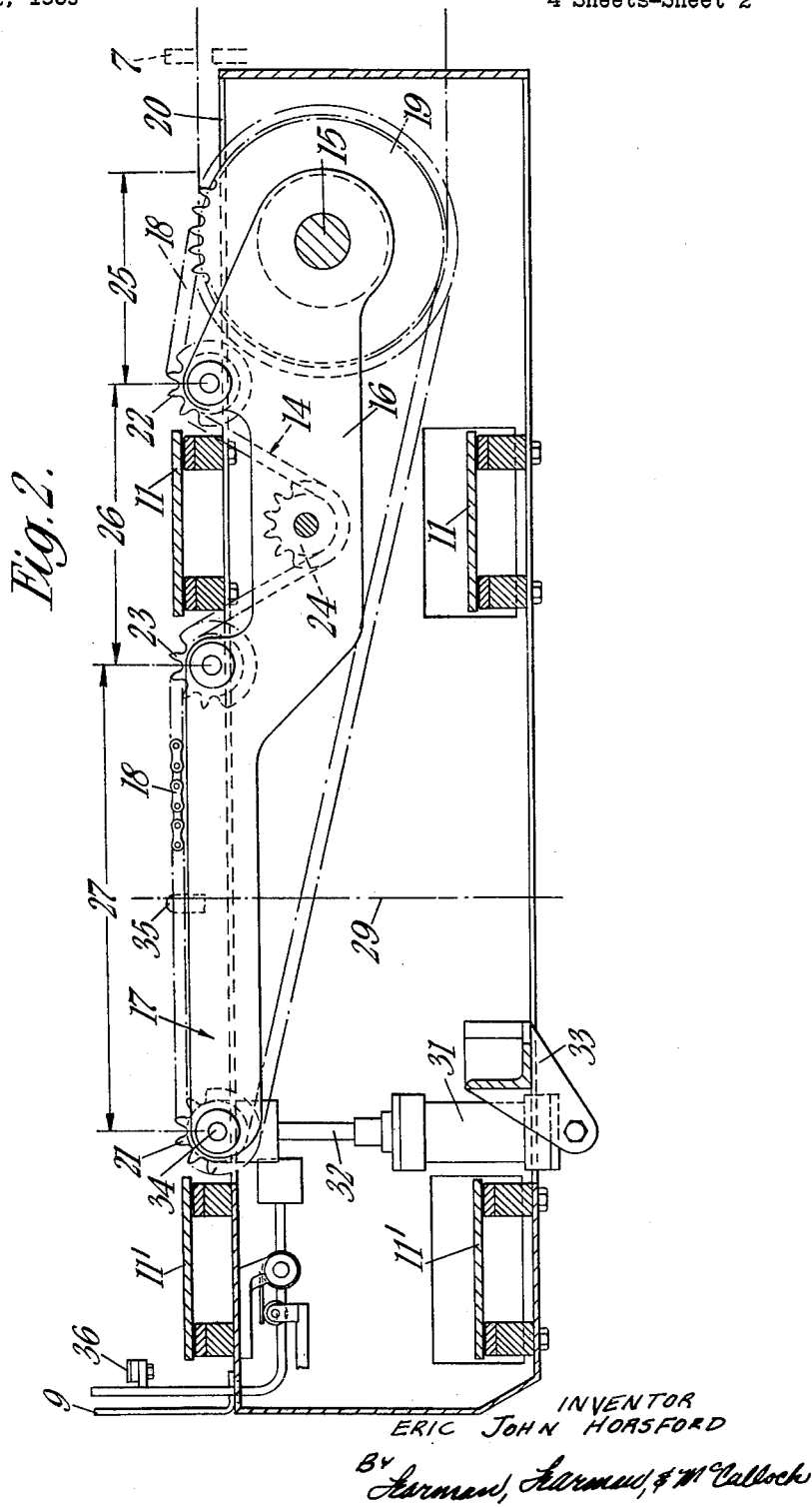
Figure 3:
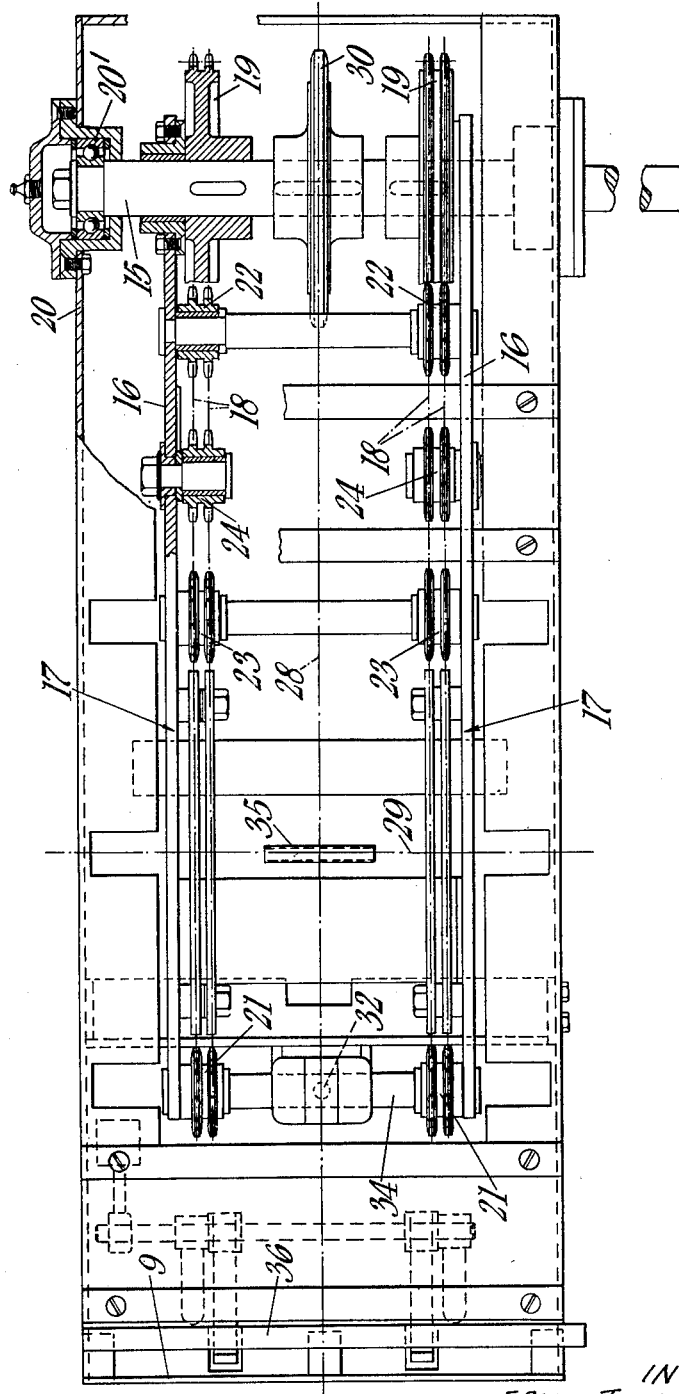
Figure 4:
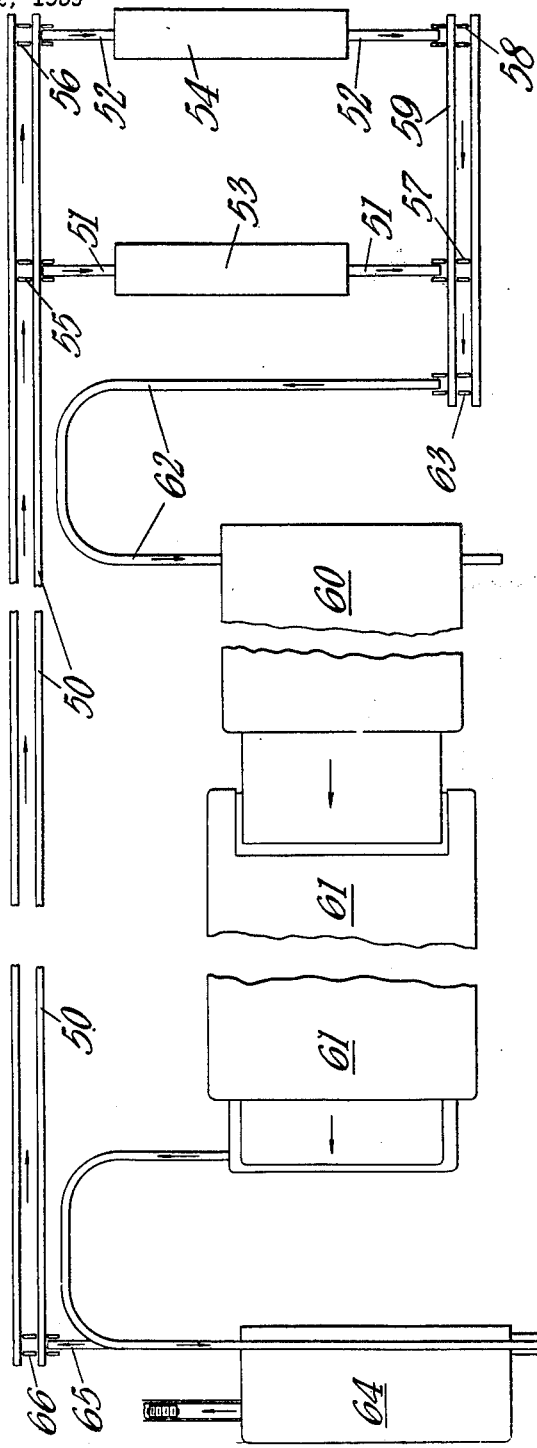

In the accompanying drawings:
FIGURE 1 is a diagrammatic plan view of part of a conveyor system showing transfer conveyor means according to the present invention,
FIGURE 2 is a side elevation of one form of transfer conveyor means according to the present invention,
FIGURE 3 is a plan view of the transfer conveyor means shown in FIGURE 2, and
FIGURE 4 is a diagrammatic plan view of bakery plant conveyor layout using transfer conveyor means, according to the present invention.

According to one useful application of transfer device as set out above, it may be requisite to transfer articles e.g. strapped groups of bread tins 1 from a first main conveyor 2 to a second main conveyor 3 disposed parallel to the first conveyor 2 but running back in the opposite direction, the termination of the first conveyor 2 being level with the commencement of the second conveyor 3. Spanning the gap between the level ends of the two conveyors 2 and 3 is a cross conveyor 4. A transfer conveyor, according to the present invention, indicated at 5 and described hereinafter, is provided in extension of the first conveyor 2 and crosses the axis of the cross conveyor 4, so that it can be fed with an article 1 from the first conveyor 2, elevate and convey the article clear of the surface of the cross conveyor 4 until the article is centred on the axis of the cross conveyor 4, then lower the article until it is supported on the cross conveyor 4 so that it is carried onwards by the cross conveyor 4. At this transfer station A the first conveyor 2 is the feeding conveyor and the cross conveyor 4 the receiving conveyor.

In order to transfer the article 1 on to the second main conveyor 3 as intended, a second transfer conveyor 6, similar to the transfer conveyor 5, is provided in extension of the second conveyor 3, and crosses the axis of the cross conveyor 4 at a transfer station B spaced from the first transfer station A, so that the transfer conveyor 6 can rise up beneath the article on the cross conveyor 4 when it reaches the transfer station B, elevate it clear of the surface of the cross conveyor 4 and convey it on to the second conveyor 3. At transfer station B the cross conveyor 4 is the feeding conveyor and the second conveyor 3 the receiving conveyor.

So as to deal with one article at a time, stop means 7 is associated with the transfer conveyor 5 and the feeding conveyor 2 and stop means 8 is associated with the transfer conveyor 6 and the feeding (cross) conveyor 4, so as to prevent subsequent articles being delivered on to either of the transfer conveyors 7 or 8 until the latter are clear. Further stop means 9 is associated with the transfer conveyor 5 and the receiving (cross) conveyor 4 and further stop means 10 is associated with the transfer conveyor 6 and the delivery end of the feeding (cross) conveyor 4 for ensuring correct alignment of articles in transfer with respect to the relevant receiving conveyor, i.e. the cross conveyor 4 or main conveyor 3, at the moment of transfer of articles from the transfer conveyor 5 to the receiving (cross) conveyor 4 at station A where the transfer conveyor 5 extends at right angles to the receiving (cross) conveyor 4, or from the feeding (cross) conveyor 4 to the transfer conveyor 6 at station B where the latter extends in alignment with the receiving conveyor 3. The operation of the various stop means is described hereafter.

For convenience in effecting transfer of the articles to and from the cross conveyor 4, or to a receiving conveyor, which may be in the position of the conveyor 4 or the conveyor 3, and from a feeding conveyor which may be in the position of the conveyor 1 on the conveyor 4, the cross conveyor 4 which may be a receiving conveyor or a feeding conveyor, comprises two spaced parallel runs 11 and 11' of endless conveyor bands or the like, the gap 12 between which the articles 1 can span. By this arrangement the transfer conveyor 5 or 6 can be bodily pivotal about an axis 13 away from the cross conveyor 4 and can be made to run on a path 14 which is deflected beneath the nearer run 11 of the spaced runs of the cross conveyor 4 and which resumes its level over the distance of the gap 12 between the spaced runs 11 and 11', the path 14 of the transfer conveyor 5 or 6 being deflected sufficiently to permit a raising movement of the transfer conveyor 5 or 6 to carry an article thereon clear of the surfaces of the spaced conveyor runs 11 and 11' to effect transfer of the article to or from the spaced runs 11 and 11' of the cross conveyor 4.

The structure of the transfer conveyor 5 or 6 may comprise, according to one convenient form, see FIGURES 2 and 3, a supporting structure 20 carrying on bearings 20' a horizontal shaft 15 on which is freely mounted a spaced pair of swingable arms 16 which form the side members of a raisable and lowerable transfer conveyor framework 17. The shaft 15 thus comprises the above mentioned pivotal axis 13 of the transfer conveyor. The conveyor itself comprises two spaced runs of belts or chains 18, located in each side of the conveyor framework 17 adjacent the arms 16 and each of which pass around a large diameter terminal pulley wheel 19 secured on the horizontal shaft 15 about which the transfer conveyor framework 17 swings. At the other, swinging, end of the conveyor framework 17, is a small diameter terminal pulley wheel 21 for each conveyor belt or chain 18, and the upper run of each conveyor belt or chain 18 is deflected downwardly over the aforesaid path 14 between a spaced pair of small diameter pulley wheels 22 and 23 by a small pulley wheel 24 located below the level of the spaced pair of pulley wheels 22 and 23. In this manner, the upper run of each conveyor belt or chain 18 is in three sections, viz. section 25, from the large diameter pulley wheel 19 to the nearer wheel 22 of the spaced pair of pulley wheels 22 and 23 and which forms a lead-on or lead-off run for the transfer conveyor; section 26, between the spaced pair of small diameter pulley wheels 22 and 23 and under the pulley wheel 24 where the transfer conveyor is deflected downwardly in the aforesaid path 14 to run beneath the nearer run 11 of the cross conveyor 4 and, section 27 from the further wheel 23 of the spaced pair of pulley wheels 22 and 23 to the small diameter terminal pulley wheel 21 and which forms a substantially level run of the transfer conveyor. The longitudinal axis 28 (see FIGURE 1 or 3) of the transfer conveyor 5 or 6 is disposed, in use, in alignment with either the feeding conveyor 2 or the receiving conveyor 3 and is set at right angles (or other convenient angle) to the cross conveyor 4 which, as mentioned above, may comprise either a receiving conveyor as at station A or a feeding conveyor as at station B. The cross conveyor 4 is of the "broad" type having, as mentioned, the two spaced parallel, active or article-supporting, runs 11 and 11' and is disposed with respect to the path of the transfer conveyor 5 or 6 such that the run 11 of the cross conveyor 4 nearer to the swing axis 13 of the transfer conveyor framework 17 is located in the gap in the transfer conveyor caused by the above-mentioned deflected section 26 of the transfer conveyor belts or chains 18 and that the section 27 of the transfer conveyor, see above, is located in the gap 12 between the two runs 11 and 11' of the cross conveyor 4.

By this arrangement, an article fed onto the transfer conveyor 5 by the aligned feeding conveyor 2 can be carried over the axis 29 of the cross conveyor 4 by the transfer conveyor 5 by a lifting of the transfer conveyor framework 17 which causes the article to clear and to travel over the surface of the nearer run 11 of the cross conveyor 4 without touching it and to be carried on until the article spans both runs 11 and 11' of the cross conveyor 4 when a lowering of the transfer conveyor framework 17 causes the article to be deposited on, and to be supported solely by, both runs 11 and 11' of the cross conveyor 4 which can then carry the article away.

Conversely, an article, fed along by a spaced (i.e. double) run or "broad conveyor" e.g. on the runs 11 and 11' of the cross conveyor 4 to the transfer station B of the transfer conveyor 6 (set substantially at right angles to the axis 29 of the cross conveyor 4 and in alignment with the receiving conveyor 3), can be lifted off the cross conveyor 4 by a lifting movement of the transfer conveyor framework 17 and carried clear of it at right angles and be transferred to the aligned receiving conveyor 3, the transfer conveyor framework 17 being subsequently lowered again to be in a position below the level of the cross conveyor 4 to underlie the next article reaching the transfer station B, prior to lifting it off the cross conveyor 4.

Each transfer conveyor 5 or 6 is driven, through the horizontal shaft 15 and a sprocket wheel 30 thereon (see FIGURE 3), at substantially the same speed as the feeding conveyor 2 in the case of the transfer conveyor 5 or the receiving conveyor 3 in the case of the transfer conveyor 6, or at any desired suitable speed differential thereto.

The raising and lowering of the transfer conveyor framework 17 is accomplished by any convenient means operable at appropriate times when an article is in the desired relationship to the transfer station A or B. Such means comprise in the form illustrated in FIGURE 2, a hydraulic or pneumatic piston and cylinder device 31 (or an electric solenoid device), secured to the transfer conveyor supporting structure 33 and coupled to the transfer conveyor framework 17 by a connecting rod 32, preferably at a point remote from its horizontal axis 13 of swing, e.g. to a shaft 34 on which the small diameter terminal pulley wheels 21 are mounted.

As mentioned above stop means are provided in association with the feeding, receiving and transfer conveyors to ensure segregation of articles on the transfer conveyor and to ensure a proper placing of each article at the moment of transfer. Thus (see FIGURE 1) a trigger 35 (or other detecting means such as a photo-electric cell device) in the path of an article moving onto and along the transfer conveyor 5 from the aligned feeding conveyor 2 is actuated by that article to raise the stop 7 behind the article and on or adjacent the feeding conveyor 2 to hold up any succeeeding articles until the article on the transfer conveyor 5 has been transferred to the receiving (cross) conveyor 4. Adjacent the receiving (cross) conveyor 4, which runs at right angles to the transfer conveyor 5, is the fixed stop 9 which arrests the article on the transfer conveyor 5 when the centre of the article has reached a position on the transfer conveyor in alignment with the axis 29 of the receiving (cross) conveyor 4. Associated with the fixed stop 9 is a trigger 36 (or other detector means) which, when actuated by the arrival of the article, causes the mechanism (e.g. the hydraulic or pneumatic device 31) of the transfer conveyor 5 to lower the transfer conveyor framework 17 and so deposit the article on the spaced runs 11 and 11' of the receiving (cross) conveyor 4 which then carries it away.

Where as at station B the transfer conveyor 6 is at right angles to the feeding conveyor, i.e. the cross conveyor 4, and aligned with the receiving conveyor 2, a similar system of stops and control triggers or other detector means is provided so that when an article is delivered over the transfer conveyor 6, the stop 8 associated with the feeding (cross) conveyor 4 is raised behind the article to prevent the feed of further articles as a result of the article actuating a trigger 37 (or other detector means) located on the transfer conveyor 6 and when the article reaches the correct position over the axis of the transfer conveyor 6 it is arrested by the stop 10 and the transfer conveyor frame is raised to lift the article off the feed conveyor and carry it away as a result of the article actuating a trigger 38 (or other detector means) located on or associated with the stop 10.

In addition to the above control means, further similar controls of a conventional nature are incorporated for re-positioning the transfer conveyors 5 or 6 for receiving the next succeding article and for removing the stops 7 or 8 holding up the feed to the transfer conveyors.

While the present invention has been described above with reference to the transfer of articles, it has particular utility in bakery installation more particularly for handling bread tins strapped in known manner into groups, say, of four tins, to provide a composite article of elongated rectangular plan view, e.g. the sides having a proportion of about 2 to 1. Such strapped groups of tins may be delivered (as is illustrated in FIGURE 1) by a feeding conveyor with their major plan dimension aligned with the feeding conveyor axis and transferred (as at station A) to a receiving conveyor so that the major plan dimension is at right angles to the axis of the receiving conveyor thus enabling the receiving conveyor to be a double run or broad conveyor where the strapped group of tins spans the gap between the runs. Conversely, the groups of tins may be delivered by a double run or broad conveyor being disposed thereon with their major plan dimension at right angles to the conveyor axis so that they span the gap between the runs, and transferred (as at station B) to a receiving conveyor such that the major plan dimension of each tin group is aligned with the axis of the receiving conveyor.

Further the invention has particular utility in bakery plants in which the layout makes it necessary to provide a conveyer system which at various points turns the lines of conveying paths at right angles, for example, where two moulding and panning machines serve one oven (via a prover) and it is necessary to divide a stream of empty bread tins (singly or in strapped groups) carried on one conveyor line into two conveyor lines passing through the two moulding/panning machines and to recombine these two lines back into a single stream for delivery into the prover and thence to the oven. FIGURE 4 shows diagrammatically an example of such a layout where the bread this (not shown) are in strapped groups and the above conveyer system may comprise a broad (i.e. spaced double run) conveyor 50 to deliver the stream of empty tins across the lines of feed conveyor 51, 52 of two moulding/panning machines 53, 54, transfer conveyors 55, 56 according to the present invention, being provided at the points of intersection of the broad conveyor 50 with the two feed conveyors 51, 52 which relatively narrower conveyors receive and deliver the strapped tins in line to the moulding/panning machines 53, 54. The strapped tins span across the broad conveyor 50 and are transferred endwise therefrom to be disposed in end to end alignment on the narrower receiving conveyors 51, 52. At the output end of the moulding/panning machines 53, 54, the filled tins are carried on by the narrow conveyors to transfer conveyors 57, 58, according to the present invention, which transfer the tins back to another broad conveyor 59 running at right angles across the ends of the narrow conveyors from the moulding/panning machine 53, 54. The filled tins may then be conveyed to a prover 60 direct (and thence to an oven 61), or as shown, be converted once again to end-to-end alignment on a narrow conveyor 62 by further use of a transfer conveyor 63, according to the present invention, and then delivered to the prover 60. At the delivery end of the oven 61, the tins pass to a detining machine 64, from which the empty tins emerge in end-to-end alignment on a narrow conveyor 65 from the tins are transferred to the broad conveyor 50 by a transfer conveyor 66, according to the present invention, Where such an arrangement is adopted the operation and control of the transfer conveyor means, particularly those working on a common conveyor, e.g. on the broad conveyor transferring tins to the narrow conveyors to feed the moulding/panning machines, and on the narrow conveyors transferring tins to the broad conveyor after moulding and panning, will comprise the use of the stops and control triggers or other detecting devices as mentioned above, together with any suitable known form of "interlocking" unified control circuit governing the operation of the stops and control triggers or other detecting devices to ensure balanced feeding of the two moulding/panning machines or preferential feeding as required, and to ensure that tin groups do not interfere or collide with one another.

I claim:

1. Apparatus for transferring articles from a feeding conveyor means to a receiving conveyor means spaced from said feeding conveyor means and having its longitudinal axis extending transversely of the longitudinal axis of said feeding conveyor means, at least one of said conveyor means including at least a pair of spaced endless conveyor elements together defining a path along which articles may be conveyed, said apparatus comprising a transfer conveyor means bridging the space between said feeding conveyor means and said receiving conveyor means and including an endless driven conveyor member providing an article supporting run, said conveyor member having a section of its supporting run displaced beneath the path defined by one conveyor element of said pair of conveyor elements whereby to form a gap in said supporting run, the remaining section of said supporting run being substantially continuous; means mounting said transfer conveyor means for raising and lowering movements such that said remaining section of said supporting run moves to positions respectively above and below the level of said path of said receiving conveyor means; and means connected to said transfer conveying means for raising and lowering the latter.

2. The apparatus set forth in claim 1 including means connected to said raising and lowering means operable in response to the delivery of articles to said transfer conveyor means for operating said raising and lowering means.

3. The apparatus set forth in claim 1 wherein said one of said conveyor means is said receiving conveyor means.

4. The apparatus set forth in claim 1 wherein said one of said conveyor means is said feeding conveyor means.

5. Apparatus for transferring articles from a feeding conveyor means to a receiving conveyor means spaced from said feeding conveyor means and extending transversely of said feeding conveyor means, said receiving conveyor means including at least a pair of spaced apart substantially parallel, endless conveyor elements having upper runs defining a conveyor path along which articles may move, said apparatus comprising a transfer conveyor means bridging the space between said feeding conveyor means and said receiving conveyor means and extending from adjacent the end of said feeding conveyor means to at least half way between the conveyor elements of said receiving conveyor means, said transfer conveyor means including an endless driven conveyor member providing an article supporting run, said conveyor member having a section of its supporting run intermediate its ends passing beneath one of said conveyor elements whereby to form a gap in said supporting run, the remaining section of said supporting run being substantially continuous; means mounting said transfer conveyor means for raising and lowering movements such that said remaining section of said supporting run moves to positions respectively above and below the level of said path of said receiving conveyor means; and means connected to said transfer means for raising and lowering the latter.

6. Apparatus for transferring articles from a feeding conveyor means to a receiving conveyor means spaced from said feeding conveyor means and extending transversely of said feeding conveyor means, said feeding conveyor means including at least a pair of spaced apart, substantially parallel, endless conveyor elements having upper runs defining a conveyor path along which articles may move, said apparatus comprising a transfer conveyor means bridging the space between said feeding conveyor means and said receiving conveyor means and extending from adjacent the end of said receiving conveyor means to at least half way between the conveyor elements of said feeding conveyor means, said transfer conveyor means including an endless driven conveyor member providing an article supporting run, said conveyor member having a section of its supporting run intermediate its ends passing beneath one of said conveyor elements whereby to form a gap in said supporting run, the remaining section of said supporting run being substantially continuous; means mounting said transfer conveyor means for raising and lowering movements such that said remaining section of said supporting run moves to positions respectively above and below the level of said path of said receiving conveyor means; and means connected to said transfer means for raising and lowering the latter.

7. Apparatus for transferring articles from a feeding conveyor means to a receiving conveyor means spaced from said feeding conveyor means and having its longitudinal axis extending transversely of the longitudinal axis of said feeding conveyor means, at least one of said conveyor means including at least a pair of spaced, endless conveyor elements together defining a path along which articles may be conveyor, said apparatus comprising an endless transfer conveyor bridging the space between said feeding conveyor means and said receiving conveyor means; frame means extending beneath the path of one of said conveyor elements; means mounting said endless conveyor on said frame means to provide an upper article supporting run, said mounting means including means for conducting a portion of said article supporting run beneath the path defined by said one of said conveyor elements to form a gap in said supporting run, the remaining section of said supporting run being substantially continuous; means mounting said frame means adjacent one end of the latter for pivotal movements about a substantially horizontal axis for raising and lowering movements of said transfer conveyor such that said remaining section of said supporting run moves to positions respectively above and below the level of said path of said receiving conveyor means; and means connected to said transfer conveyor for pivoting the latter.

References Cited in the file of this patent
UNITED STATES PATENTS

| | | |
|---|---|---|
| 1,737,762 | Howe | Dec. 3, 1929 |
| 1,889,065 | Gentil | Nov. 29, 1932 |
| 2,673,640 | Temple | Mar. 30, 1954 |
| 2,681,130 | Atwood | June 15, 1954 |
| 2,734,643 | McRae | Feb. 14, 1956 |